A. LAUER & J. HARTMANN.

PLOW.

No. 7,803. Reissued July 17, 1877.

WITNESSES:

W. W. Hollingsworth

Geo. E. Kenon

INVENTOR:

Anton Lauer

Julius Hartmann

BY

ATTORNEYS.

N. PETERS, PHOTO-LITHOGRAPHER, WASHINGTON, D. C.

UNITED STATES PATENT OFFICE.

ANTON LAUER, AND JULIUS HARTMANN, OF LOUISVILLE, KENTUCKY.

IMPROVEMENT IN PLOWS.

Specification forming part of Letters Patent No. 190,500, dated May 8, 1877; Reissue No. 7,803, dated July 17, 1877; application filed July 5, 1877.

*To all whom it may concern:*

Be it known that we, ANTON LAUER and JULIUS HARTMANN, of Louisville, in the county of Jefferson and State of Kentucky, have invented a new and useful Improvement in Plows; and we do hereby declare that the following is a full, clear, and exact description of the same:

The object of our invention is to furnish an improvement in the class of center-draft plows—that is to say, plows whose line of draft intersects the share, or both share and mold-board together. The particular object of our invention is to furnish a plow which shall combine, under the best conditions or relations, maximum strength, lightness, and cheapness of construction, with such form and arrangement of parts as will enable it to operate with as little friction as practicable.

To this end our invention relates chiefly to the construction of the concave plow-point, and the combination of the same with a land-side which is curved upward and outward, to adapt it to support the point, as hereinafter more fully described.

Figure 1:
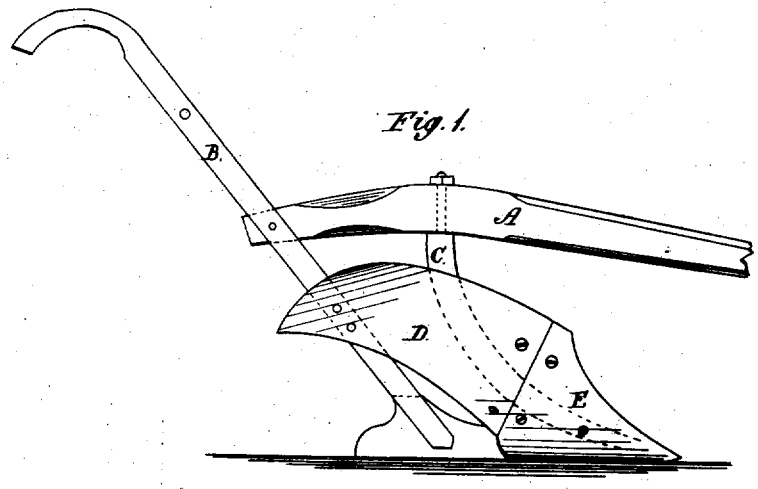
Figure 2:
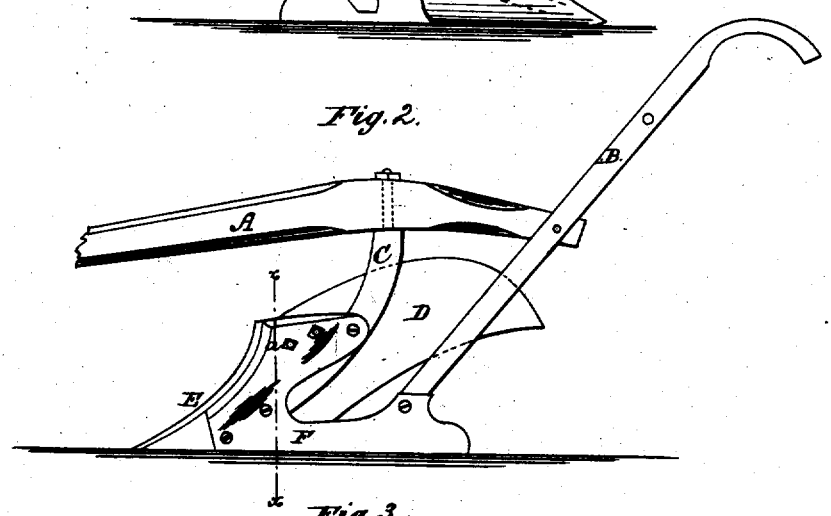
Figure 3:
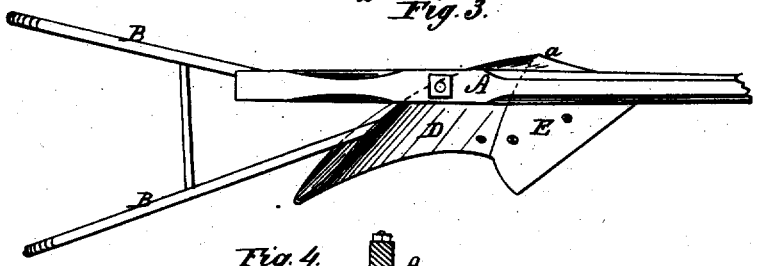
Figure 4:
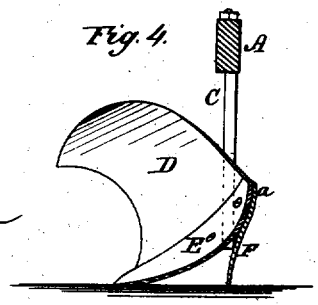

Referring to the accompanying drawing, forming part of this specification, Figures 1 and 2 are different side views of our improved plow. Fig. 3 is a plan view; and Fig. 4 a cross-section on line *x x* of Fig. 2.

The beam A and handles B B may be constructed and connected in the usual or any preferred manner. The standard C is a curved wrought-iron bar, which is beveled or inclined on one side; also reduced or tapered toward the lower end, to adapt it for attachment of the mold-board and land-side. The mold-board D and triangular point E are made from rolled steel-plate. The former D is bolted to the right handle B, and to the standard C and land-side F, its upper side being extended forward of the standard, so as to lie against the upper portion *a* of the land-side. The triangular point E meets the mold-board upon a straight, or nearly straight, line, in place of a curved, irregular, or zigzag line, as usual in this class of plows.

The cast-steel land-side F has an arm, *a*, which projects upward toward the beam and backward in the direction of the standard C, to which it is attached, and also outward or laterally along its front edge, corresponding, generally, to the curve that would be described by a continuation of the front-end mold-board. The upper part of the triangular point extends up as high as the mold-board and the land-side, and is seated or lies flat upon the front edge of arm *a*, as shown. The land-side, therefore, supports the upper portion of point E, to whose curvature it conforms. It also "breaks joint" with the mold-board and point, and, being also bolted to these parts, they are thereby firmly yet detachably connected. The front edge of the land-side is beveled, as shown, so that it coincides with the bevel of the contiguous edge of point E. The curve of the point and land-side outward or laterally from the standard relieves the land-side of friction in the operation of plowing, and the manner in which the parts are united gives great strength and rigidity to the plow at the same time that the thickness and weight of the parts are reduced to a minimum.

What we claim is—

1. The triangular point, constructed as described, in combination with the land-side extended upward and outward, and the standard, substantially as and for the purpose specified.

2. The detachable land-side F, having the upward extension *a* curved outward from the beam, in combination with the mold-board and the point, the latter being extended upward, and secured to the land-side extension, their upper portions having a corresponding curvature and lying in contact, substantially as shown and described, for the purpose specified.

ANTON LAUER.
JULIUS HARTMANN.

Witnesses to the signature of Lauer:
W. WALKER,
JOS. CLEMENTS.

Witnesses to the signature of Hartmann:
SOLON C. KEMON,
HENRY R. LEE.